May 13, 1941.  Y. D. BERGMAN  2,242,168
PLANT SUPPORT
Filed Oct. 15, 1938
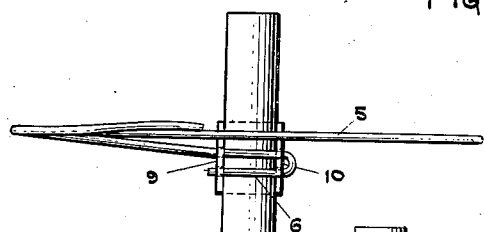
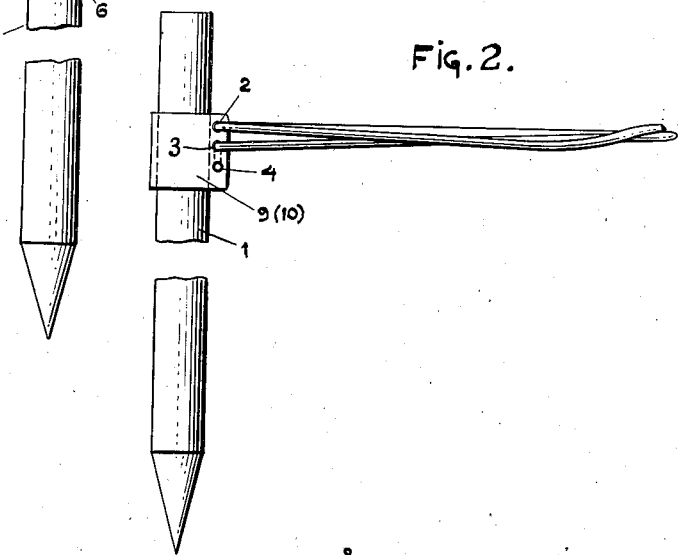
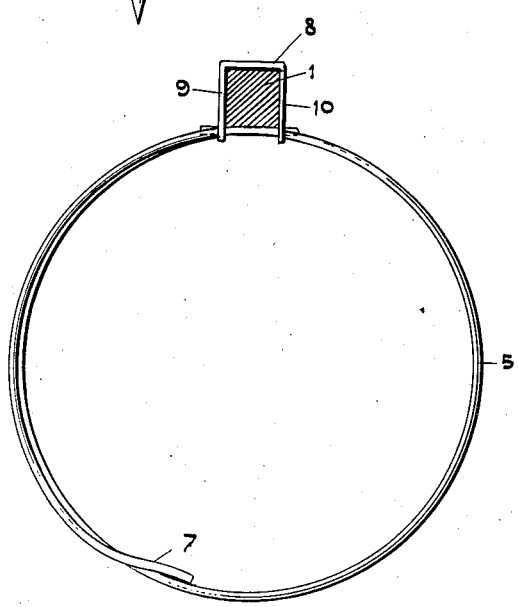
INVENTOR.
Yngve D. Bergman.
By William C. Linton Atty.

Patented May 13, 1941

2,242,168

UNITED STATES PATENT OFFICE 2,242,168

PLANT SUPPORT

Yngve David Bergman, Nassjo, Sweden

Application October 15, 1938, Serial No. 235,235
In Sweden May 11, 1937

2 Claims. (Cl. 47—47)

The present invention relates to plant supports of the kind comprising a stake intended to be put down into the ground near the plant to be supported and an open, laterally projecting ring, which is inserted in apertures in a member carried by the stake and which is adapted to embrace the plant to be supported.

According to the present invention one end of said ring is bent back to form a hook which is introduced in two of said apertures so as to maintain the ring in the laterally projecting position.

In the accompanying drawing,

Figures 1 and 2 are two side elevations of the plant support, and

Figure 3 is a top view of the plant support shown in Figures 1 and 2.

According to the embodiment shown in Figures 1 to 3 the numeral 1 refers to a wooden stake intended to be put down in the ground near the plant to be supported. A U-shaped plate 8 is slidably mounted upon the stake 1 with the side portions 9 and 10 of said plate embracing said plate frictionally in order to maintain the plate at the position upon the stake 1 to which it is manually positioned.

Each of the side portions 9 and 10 is provided with apertures 2, 3, and 4 having the axis thereof substantially parallel to each other. 5 is an open ring of steel wire or the like, the end portion 6 of which is bent back to form a hook. The hook shaped portion 6 of the ring is inserted in openings 3 and 4 with the ring extending through opening 2 and free end 7 wound around the ring thereby maintaining the ring 5 in a laterally projecting position. When storing or transporting the ring and stake, the hook shaped portion 6 is removed from the plate 8, whereupon the ring 5 may be swung down along the stake.

What I claim is:

1. A plant support comprising a stake, means having a series of openings formed therethrough and being slidably mounted longitudinally of said stake, an open end ring having an end thereof inserted through one of said openings and the opposite end of said ring being bent and having two separate portions thereof each inserted through one of said openings.

2. A plant support comprising a stake, a U-shaped plate frictionally embracing said stake and slidable longitudinally thereof, said plate having a series of closely related openings formed therethrough, an open end ring having one end thereof inserted through one of said openings and the opposite end of said ring having a U-shaped configuration with each arm thereof inserted through one of said openings for assisting in maintaining said ring substantially perpendicular to said stake.

YNGVE DAVID BERGMAN.